(12) United States Patent
Arora et al.

(10) Patent No.: US 9,204,373 B2
(45) Date of Patent: Dec. 1, 2015

(54) METHOD AND SYSTEM FOR ACQUISITION OF NEIGHBOUR CELL INFORMATION

(75) Inventors: Dinesh Kumar Arora, Waterloo (CA); Christopher Harris Snow, Waterloo (CA); Ayman Ahmed Abdel-Samad, Waterloo (CA); Nazih Almalki, Waterloo (CA)

(73) Assignee: BlackBerry Limited, Waterloo (CA)

( * ) Notice: Subject to any disclaimer, the term of this patent is extended or adjusted under 35 U.S.C. 154(b) by 905 days.

(21) Appl. No.: 12/549,846

(22) Filed: Aug. 28, 2009

(65) Prior Publication Data
US 2011/0051660 A1 Mar. 3, 2011

(51) Int. Cl.
*H04W 48/14* (2009.01)
*H04W 36/00* (2009.01)
*H04W 76/02* (2009.01)

(52) U.S. Cl.
CPC .......... *H04W 48/14* (2013.01); *H04W 36/0061* (2013.01); *H04W 76/028* (2013.01)

(58) Field of Classification Search
None
See application file for complete search history.

(56) References Cited

U.S. PATENT DOCUMENTS

| | | | |
|---|---|---|---|
| 5,416,779 A | 5/1995 | Barnes et al. | |
| 5,987,332 A | 11/1999 | Gettleman et al. | |
| 6,058,302 A * | 5/2000 | Westerberg | 455/411 |
| 6,667,962 B1 * | 12/2003 | Lee et al. | 370/335 |
| 7,162,247 B2 * | 1/2007 | Baba et al. | 455/446 |
| 7,489,928 B2 | 2/2009 | Smith | |
| 7,852,774 B2 * | 12/2010 | Shen et al. | 370/241 |
| 2002/0193111 A1 * | 12/2002 | Wallstedt et al. | 455/434 |
| 2002/0197992 A1 * | 12/2002 | Nizri et al. | 455/435 |
| 2003/0179731 A1 * | 9/2003 | Noguchi et al. | 370/331 |
| 2004/0071112 A1 * | 4/2004 | Hsu et al. | 370/331 |
| 2005/0096051 A1 * | 5/2005 | Lee et al. | 455/438 |
| 2005/0261017 A1 * | 11/2005 | Vaittinen et al. | 455/522 |
| 2006/0068780 A1 * | 3/2006 | Dalsgaard et al. | 455/432.3 |
| 2006/0209798 A1 | 9/2006 | Oikarinen et al. | |
| 2007/0010252 A1 * | 1/2007 | Balachandran et al. | 455/437 |
| 2007/0086388 A1 * | 4/2007 | Kang et al. | 370/331 |
| 2007/0167165 A1 * | 7/2007 | Yang et al. | 455/439 |
| 2007/0173250 A1 | 7/2007 | Lee et al. | |
| 2008/0167042 A1 | 7/2008 | Kitazoe | |
| 2008/0214225 A1 | 9/2008 | Choukroun et al. | |
| 2009/0017824 A1 | 1/2009 | Lee et al. | |
| 2010/0014429 A1 * | 1/2010 | Kim et al. | 370/241 |
| 2010/0240367 A1 * | 9/2010 | Lee et al. | 455/435.2 |

(Continued)

FOREIGN PATENT DOCUMENTS

| | | |
|---|---|---|
| CA | 2303367 | 3/1999 |
| CA | 2303367 A1 | 3/1999 |

(Continued)

OTHER PUBLICATIONS

Nokia, "Speech Quality & Frame Stealing", GP-012503, 3GPP TSG GERAN #7 (Nov. 2001).*

(Continued)

*Primary Examiner* — Huy D Vu
*Assistant Examiner* — James P Duffy
(74) *Attorney, Agent, or Firm* — Todd A. Keeler; Borden Ladner Gervais LLP

(57) ABSTRACT

A system and method for acquisition of neighbor cell information are provided. A serving cell receives a request for neighbor cell system information, and in response to the request, the serving cell transmits neighbor cell system information.

22 Claims, 7 Drawing Sheets

(56) References Cited

U.S. PATENT DOCUMENTS

| | | | |
|---|---|---|---|
| 2011/0039546 A1* | 2/2011 | Narasimha et al. | 455/423 |
| 2011/0080825 A1 | 4/2011 | Dimou et al. | |

FOREIGN PATENT DOCUMENTS

| | | | | |
|---|---|---|---|---|
| CN | 1411671 | A | 4/2003 | |
| CN | 101009926 | A | 8/2007 | |
| CN | 101123818 | A | 2/2008 | |
| CN | 101150382 | A | 3/2008 | |
| EP | 1806949 | | 7/2007 | |
| EP | 1809063 | | 7/2007 | |
| EP | 1809063 | A1 * | 7/2007 | H04Q 7/38 |
| EP | 1909523 | | 4/2008 | |
| EP | 1909523 | A1 | 4/2008 | |
| EP | 2056639 | A2 | 5/2009 | |
| GB | 2378092 | A | 1/2003 | |
| WO | 2009/096883 | A1 | 8/2009 | |

OTHER PUBLICATIONS

3GPP TSG RAN3#57 bis, R3-071876, (Alcatel-Lucent), Impact of Multiple handover preparations on RAN3 specifications, Sophia Antipolis, France, Oct. 8-11, 2007.
International Search Report & Written Opinion from International Application No. PCT/IB2010/002094 dated Jan. 6, 2011.
3GPP: "Radio Resource Control (RRC); Protocol Specification", 3GPP TS 25.331 V8.4.0, [Online] vol. 25.331, No. v8.4.0, Sep. 1, 2008, pp. 169-170, 284, XP002580001, Retrieved from the Internet: URL: Http://www.3gpp.org/ftp/Specs/html-info/25331.htm [retrieved on Apr. 28, 2010].
NTT DoCoMo: "Details of L3 filtering in radio link problem detection", 3GPP Draft; R4-083039, 3rd Generation Partnership Project (3GPP), Mobile Competence Centre; 650, Route Des Lucioles; F-06921 Sophia-Antipolis Cedex, France, no. Prague, Czech Republic; Nov. 6, 2008, XP050326240, [retrieved on Nov. 6, 2008].
International Search Report & Written Opinion from International Application No. PCT/IB2010/002081 dated Jan. 26, 2011.
International Search Report & Written Opinion from International Application No. PCT/IB2010/002097 dated Dec. 22, 2010.
3GPP TS 24.008 v8.5.0, Mobile radio interface Layer 3 specification; Core network protocols; Stage 3 (Release 8).
3GPP TS 45.008 v8.2.0, Radio subsystem link control (Release 8).
3GPP TS 44.018 v8.6.0, Mobile radio interface layer 3 specification; Radio Resource Control (RRC) protocol (Release 8).
3GPP TS 44.060 v8.4.0, General Packet Radio Service (GPRS); Mobile Station (MS)—Base Station System (BSS) interface; Radio Link Control/Medium Access Control (RLC/MAC) protocol (Release 8).
Office Action dated Jul. 6, 2012 from related U.S. Appl. No. 12/549,890.
Chinese Office Action dated Feb. 25, 2014 for Chinese Application No. 201080038211.4, 7 pages.
Infineon Technologies: "Validity of the PNCD information", 3GPP Draft; GP-050342_PNCD_RESET_R4, 3rd Generation Partnership Project (3GPP), Mobile Competence Centre ; 650, Route Des Lucioles ; F-06921 Sophia-Antipolis Cedex ; France, vol. TSG GERAN, no. Tampa; 20050119, Jan. 19, 2005, XP050013138.
Office Action dated Feb. 17, 2012, issued in respect of corresponding Chinese Patent Application No. 201080038212.9.
3GPP TS 45.008 version 8.3.0 Release 8, Digital cellular telecommunications system (Phase 2+); Radio subsystem link control, Jun. 2009.
3GPP TS 44.018 version 8.7.0 Release 8, Digital cellular telecommunications system (Phase 2+); Mobile radio interface layer 3 specification; Radio Resource Control (RRC) protocol, Jun. 2009.
Examiner's Report dated Feb. 24, 2015, issued in respect of corresponding Canadian Patent Application No. 2,771,842.

* cited by examiner

METHOD AND SYSTEM FOR ACQUISITION OF NEIGHBOUR CELL INFORMATION

FIELD OF THE INVENTION

The application relates to the acquisition of neighbour cell information, for example for the purpose of call re-establishment features following radio link failure.

BACKGROUND

In a GSM (Global System for Mobile communications) system, a mobile station (MS) making a voice call tracks a radio link counter, which is used to ensure the quality of the radio link (see 3GPP TS 45.008 Section 5.2). The radio link counter is used to measure the quality on the Slow Associated Control Channel (SACCH) associated with a connection (which may be used to carry a voice call). The SACCH is defined in 3GPP TS 45.002. At the start of a call, after handover, and after re-assignment, the radio link counter "S" is initialized to a network-defined Radio Link Timeout (RLT) value. After every bad SACCH block, S is decreased by 1. After every good SACCH block, S is increased by 2 (to a maximum value of RLT). If the radio channel conditions are bad, many radio blocks will be lost, and eventually the radio link counter will expire when the value of S equals the expiry value (zero). This event is termed Radio Link Failure (RLF), and at that point the device stops using the traffic channel.

The following are some commonly-seen problems leading to radio link failure:
a) Rapid radio channel degradation (e.g., due to sudden co-channel interference, an MS operating near the sensitivity limits, etc). In this case, the network may try to send a handover command to the MS, but the MS will not be able to decode and act on it. Thus, it will be "stuck" in the cell until RLF occurs.
b) The network not sending a handover message in time to avoid RLF. This could be because the handover target cell is too congested to support another call.
c) Uplink interference and/or limit-of-sensitivity (due to limited transmit power) issues. In this case, even if the MS can receive the downlink signalling, the network may not be able to decode the MS transmissions, which will result in the MS being unable to handover successfully (for example, because measurement reports from the MS are not decoded).

In GSM cells that have an enabled call re-establishment (CRE) feature (see, for example, 3GPP TS 24.008 Section 4.5.1.6, 3GPP TS 45.008 Section 6.7.2), there is a method for the MS to recover from RLF. If the mobile station is not able to access any cell which has CRE enabled, RLF results in a call drop.

If the mobile station is able to access one or more cells that have CRE enabled, a MS can use a CRE procedure, that involves finding the best cell (either a new cell, or the current cell) having an enabled call re-establishment feature, by acquiring the relevant system information (SI) messages; sending a message on the Random Access Channel (RACH) requesting a call re-establishment; and then after receiving an immediate assignment, sending a CM (connection management) Re-establishment Request message.

Successful call re-establishment allows the device to re-establish the traffic channel and to continue the call without interruption (the user does not need to manually re-dial the call and wait for the other party to answer).

An existing approach to attempting call re-establishment involves selecting the target cell, then completing an Immediate Assignment procedure. This involves repeating the process of {sending a request; waiting a random time} up to MAX_RETRANS times, and then starting a 5 second timer to ascertain that no response is coming after the last channel request message is sent. (Spacing between Channel Request messages is specified by the algorithm in 44.018 Immediate Assignment Procedure). The same procedure can be started on a subsequent cell, but not before the entire procedure (including all MAX_RETRANS iterations on the first cell, and the 5 second timeout) has been completed in the previous one.

In some cases, a mobile station will not attempt call re-establishment, even if RLF has occurred and the mobile is able to access one or more cells with CRE enabled. This is dependent on the use of the connection between the MS and the network. If the mobile station does not have an ongoing call, or all ongoing calls are in the in the call establishment or call clearing phase, i.e. any state other than the "active" state or the "mobile originating modify" state (see 3GPP TS 24.008 v.8.5.0) then call re-establishment will not be attempted, and the connection will be terminated.

BRIEF DESCRIPTION OF THE DRAWINGS

Embodiments of the invention will now be described with reference to the attached drawings in which.

DETAILED DESCRIPTION

Figure 1:
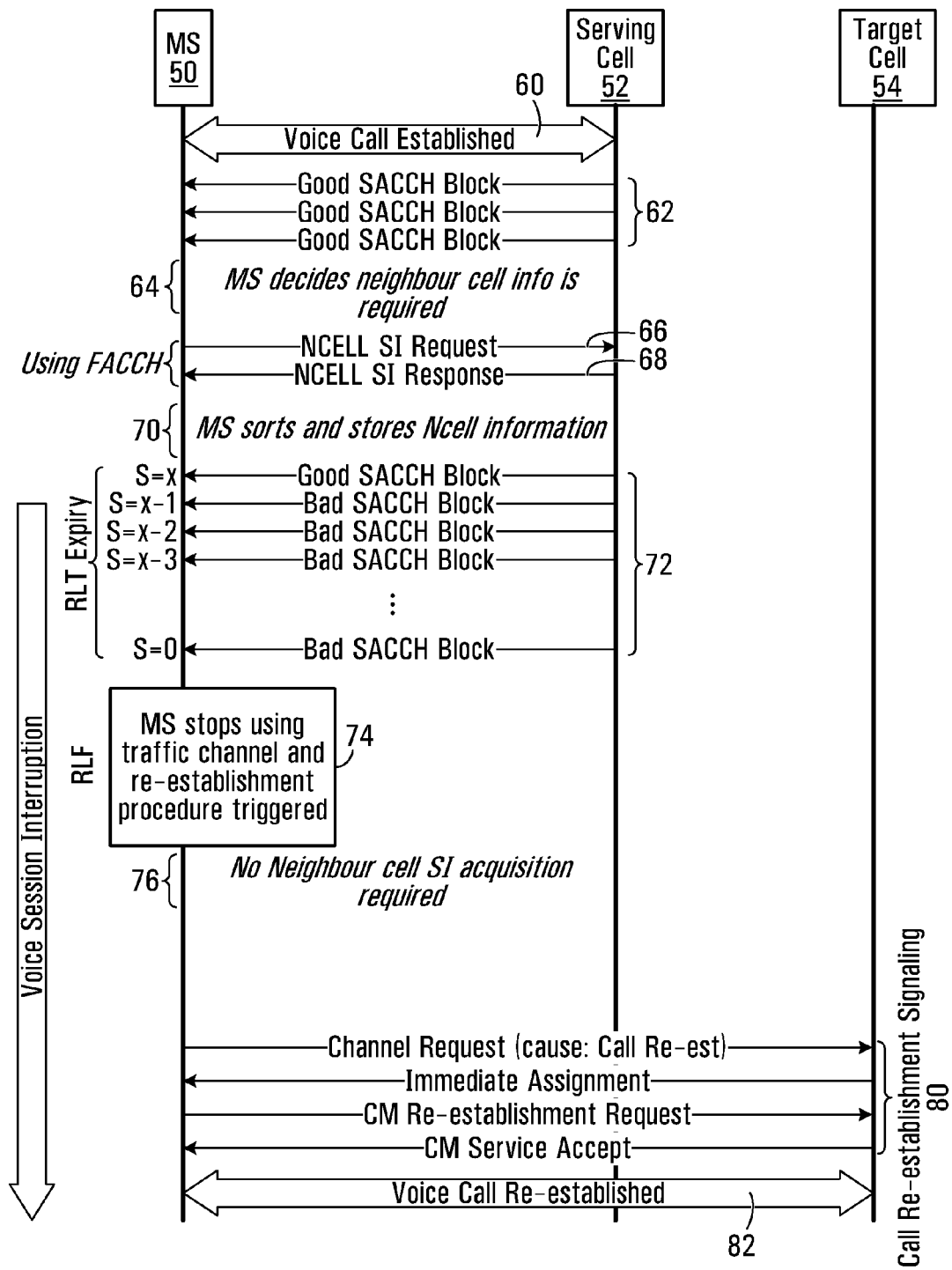
FIG. 1 depicts a first method of a mobile station obtaining neighbour cell information in advance.

Paragraph 1. A broad aspect of the disclosure provides a method comprising: a serving cell receiving a request for neighbour cell system information; in response to the request, the serving cell transmitting neighbour cell system information.

Paragraph 2. Another broad aspect of the disclosure provides the method of paragraph 1 wherein: receiving a request for neighbour cell information comprises receiving the request on an uplink control channel available to a mobile station in CS (circuit switched)-only mode; and transmitting neighbour cell system information comprises transmitting the neighbour cell information on a downlink control channel available to a mobile station in CS (circuit switched)-only mode.

Paragraph 3. Another broad aspect of the disclosure provides the method of paragraph 2 wherein each control channel is a control channel that may steal speech frames to send control information.

Paragraph 4. Another broad aspect of the disclosure provides the method of paragraph 2 wherein each control channel is a FACCH (fast associated control channel).

Paragraph 5. Another broad aspect of the disclosure provides the method of paragraph 3 or paragraph 4 further comprising transmitting neighbour cell system information during a downlink discontinuous transmission period.

Paragraph 6. Another broad aspect of the disclosure provides the method of paragraph 2 wherein each control channel is a SACCH (slow associated control channel).

Paragraph 7. Another broad aspect of the disclosure provides the method of paragraph 1 wherein: receiving a request for neighbour cell information comprises receiving the request on an uplink packet switched control channel available to a mobile station having a packet switched connection; transmitting neighbour cell system information comprises transmitting the neighbour cell information on a downlink packet switched control channel available to a mobile station having a PS connection.

Paragraph 8. Another broad aspect of the disclosure provides the method of paragraph 7 wherein each control channel is a PACCH (packet associated control channel).

Paragraph 9. Another broad aspect of the disclosure provides the method of any one of paragraphs 1 to 8 wherein: the request contains an identification of at least one neighbour cell.

Paragraph 10. Another broad aspect of the disclosure provides the method of any one of paragraphs 1 to 9 wherein the request contains an indication of which system information is being requested.

Paragraph 11. Another broad aspect of the disclosure provides the method of any one of paragraphs 1 to 9 wherein: a request for neighbour cell information that does not contain an identification of at least one neighbour cell is treated as a request for system information for all of the neighbour cells.

Paragraph 12. Another broad aspect of the disclosure provides the method of any one of paragraphs 1 to 11 wherein: a request for neighbour cell information that does not contain an indication of any specific system information is treated as a request for all of a predefined set of system information.

Paragraph 13. Another broad aspect of the disclosure provides the method of paragraph 9 wherein the indication of which system information is being requested comprises a bitmap in respect of a set of defined SI blocks.

Paragraph 14. Another broad aspect of the disclosure provides the method of any one of paragraphs 1 to 13 further comprising: prioritizing the neighbour cell system information transmission by transmitting system information taking into account prioritization.

Paragraph 15. Another broad aspect of the disclosure provides the method of any one of paragraphs 1 to 14 further comprising: transmitting a "no change" message to indicate there is no change to previously transmitted neighbour cell system information.

Paragraph 16. Another broad aspect of the disclosure provides the method of any one of paragraphs 1 to 15 further comprising: configuring a system information validity that is longer than 30 seconds at least for the transmitted neighbour cell system information.

Paragraph 17. Another broad aspect of the disclosure provides the method of any one of paragraphs 1 to 16 further comprising: transmitting an indication of support for responding to the request for neighbour cell system information.

Paragraph 18. Another broad aspect of the disclosure provides a method in a mobile station, the method comprising: transmitting a request for neighbour cell system information; in response to the request, receiving neighbour cell system information.

Paragraph 19. Another broad aspect of the disclosure provides the method of paragraph 18 wherein: transmitting a request for neighbour cell information comprises transmitting the request on an uplink control channel available to the mobile station in CS (circuit switched)-only mode; and receiving neighbour cell system information comprises receiving the neighbour cell information on a downlink control channel available to the mobile station in CS (circuit switched)-only mode.

Paragraph 20. Another broad aspect of the disclosure provides the method of paragraph 19 wherein each control channel is a control channel that steals speech frames to send control information.

Paragraph 21. Another broad aspect of the disclosure provides the method of paragraph 19 wherein each control channel is a FACCH (fast associated control channel).

Paragraph 22. Another broad aspect of the disclosure provides the method of paragraph 19 wherein each control channel is a SACCH.

Paragraph 23. Another broad aspect of the disclosure provides the method of paragraph 18 wherein: transmitting a request for neighbour cell information comprises transmitting the request on an uplink packet switched control channel available to the mobile station having a PS connection; receiving neighbour cell system information comprises receiving the neighbour cell information on a downlink packet switched control channel available to the mobile station having a PS connection.

Paragraph 24. Another broad aspect of the disclosure provides the method of paragraph 23 wherein each control channel is a PACCH (packet associated control channel).

Paragraph 25. Another broad aspect of the disclosure provides the method of any one of paragraphs 18 to 24 wherein: the request contains an identification of at least one neighbour cell, and for each neighbour cell thus identified an indication of which system information is being requested.

Paragraph 26. Another broad aspect of the disclosure provides the method of paragraph 25 wherein the indication of which system information is being requested comprises a bitmap in respect of a set of defined SI blocks.

Paragraph 27. Another broad aspect of the disclosure provides the method of any one of paragraphs 18 to 26 further comprising: receiving a "no change" message to indicate there is no change to previously transmitted neighbour cell system information.

Paragraph 28. Another broad aspect of the disclosure provides the method of any one of paragraphs 18 to 27 further comprising: using a system information validity that is longer than 30 seconds at least for the transmitted neighbour cell system information.

Paragraph 29. Another broad aspect of the disclosure provides the method of any one of paragraphs 18 to 28 further comprising: processing system information in respect of the serving cell to look for an indication that responding to the request for neighbour cell system information is supported by the serving cell.

Paragraph 30. Another broad aspect of the disclosure provides the method of paragraph 29 further comprising: only transmitting the request for neighbour cell system information when the indication that responding to the request for neighbour cell system information is found.

Paragraph 31. Another broad aspect of the disclosure provides the method of any one of paragraphs 18 to 30 further comprising: initiating call re-establishment after radio link failure without receiving system information on broadcast channels from a target neighbour cell.

Paragraph 32. Another broad aspect of the disclosure provides the method of any one of paragraphs 18 to 31 further comprising: requesting system information only for a predetermined number of top neighbour cells ranked according to at least one of the received signal quality and received signal strength of transmissions from said neighbour cells.

Paragraph 33. Another broad aspect of the disclosure provides the method of any one of paragraphs 18 to 32 further comprising: after a cell change, determining whether there is a neighbour cell that was also a neighbour cell prior to the cell change; upon determining there is such a cell, the mobile station, considering as valid any neighbour cell system information for that cell received prior to the cell change.

Paragraph 34. Another broad aspect of the disclosure provides the method of any one of paragraphs 18 to 33 wherein: transmitting the request is performed when some measurement of received signal quality for the serving cell falls below/rises above some defined threshold.

Paragraph 35. Another broad aspect of the disclosure provides the method of any one of paragraphs 18 to 34 wherein: transmitting the request is performed when some measurement of received signal strength for the serving cell falls below/rises above some defined threshold.

Paragraph 36. Another broad aspect of the disclosure provides the method of paragraph 20 or 21 further comprising: transmitting the request during an uplink discontinuous transmission period.

Paragraph 37. Another broad aspect of the disclosure provides the method of any one of paragraphs 18 to 36 comprising transmitting multiple requests for neighbour cell system information in respect of different neighbour cells.

Paragraph 38. Another broad aspect of the disclosure provides the method of any one of paragraphs 18 to 37 further comprising: storing the received neighbour cell system information; identifying the cells having an enabled call re-establishment feature; arranging the cells identified as having an enabled call re-establishment feature according to signal level measurements; after a radio link failure, making a request to a best neighbour cell of the cells identified as having an enabled call re-establishment feature, as identified according to signal level measurements.

Paragraph 39. Another broad aspect of the disclosure provides a method comprising: a serving cell transmitting neighbour cell system information in respect of at least one neighbour cell on a slow associated control channel or on a fast associated control channel.

Paragraph 40. Another broad aspect of the disclosure provides the method of paragraph 39 further comprising transmitting neighbour cell system information during a downlink discontinuous transmission period.

Paragraph 41. Another broad aspect of the disclosure provides a method comprising: a serving cell transmitting neighbour cell system information in respect of at least one neighbour cell on a packet associated control channel by transmitting at least one message containing selected fields of a plurality of SI blocks for at least one neighbour cell in support of call re-establishment or some other defined function.

Paragraph 42. Another broad aspect of the disclosure provides the method of paragraph 39 wherein transmitting neighbour cell system information on a slow associated control channel or a fast associated control channel comprises: the serving cell transmitting at least one message containing the contents of at least one SI in respect of the serving cell; the serving cell transmitting at least one message containing neighbour cell system information.

Paragraph 43. Another broad aspect of the disclosure provides the method of paragraph 42 wherein the serving cell transmitting a message containing neighbour cell system information comprises: transmitting at least one message containing selected fields of at least one SI block for at least one neighbour cell.

Paragraph 44. Another broad aspect of the disclosure provides the method of paragraph 43 wherein transmitting at least one message containing selected fields of at least one SI block for at least one neighbour cell comprises transmitting at least one message containing selected fields of a plurality of SI blocks for at least one neighbour cell in support of call re-establishment.

Paragraph 45. Another broad aspect of the disclosure provides the method of paragraph 39 wherein transmitting neighbour cell system information on a slow associated control channel or a fast associated control channel comprises: transmitting at least one message containing selected fields of a plurality of SI blocks for at least one neighbour cell in support of call re-establishment.

Paragraph 46. Another broad aspect of the disclosure provides the method of paragraph 42 wherein the serving cell transmitting at least one message containing the contents of at least one SI block in respect of the serving cell and the serving cell transmitting at least one message containing neighbour cell system information in support of call re-establishment comprises: transmitting a sequence of messages, the sequence of messages comprising a first repeating pattern of messages containing contents of at least one SI block in respect of the serving cell and messages containing neighbour cell system information in support of call re-establishment.

Paragraph 47. Another broad aspect of the disclosure provides the method of paragraph 46 wherein the serving cell transmitting at least one message containing the contents of at least one SI block in respect of the serving cell and the serving cell transmitting at least one message containing neighbour cell system information in support of call re-establishment comprises: transmitting a sequence of messages, the sequence of messages comprising a second repeating pattern of messages containing contents of at least one SI block in respect of the serving cell and messages containing neighbour cell system information in support of call re-establishment; wherein the second repeating pattern differs from the first repeating pattern and is used at times distinct from times used for the first repeating pattern.

Paragraph 48. Another broad aspect of the disclosure provides the method of paragraph 47 further comprising: selecting between using the first repeating pattern and the second repeating pattern as a function of how much neighbour cell system information is to be transmitted.

Paragraph 49. Another broad aspect of the disclosure provides the method of any one of paragraphs 39 to 48 wherein the neighbour cell system information comprises at least one of:

Cell Channel Description IE (information element) of each cell (16 octets, 44.018 Section 10.5.2.1b), Control Channel Description IE of each cell (3 octets, 44.018 Section 10.5.2.11), Cell Selection Parameters IE of each cell (3 octets, 44.018 Section 10.5.2.4), RACH control parameter IE of each cell (3 octets, 44.018 Section 10.5.2.29), and Location Area Identification IE of each cell (5 octets, 24.008 Section 10.5.1.3).

Cell Options (BCCH) of each cell (1 octet, 44.018 Section 10.5.2.3),

Cell Identity for each cell (2 octets, 24.008 Section 10.5.1.1).

Paragraph 50. Another broad aspect of the disclosure provides a method in a mobile station comprising: receiving neighbour cell system information in respect of at least one neighbour cell on a slow associated control channel or a fast associated control channel.

Paragraph 51. Another broad aspect of the disclosure provides a method comprising: a mobile station receiving neighbour cell system information in respect of at least one neighbour cell on a packet associated control channel by receiving at least one message containing selected fields of a plurality of SI blocks for at least one neighbour cell in support of call re-establishment.

Paragraph 52. Another broad aspect of the disclosure provides the method of paragraph 50 wherein receiving neighbour cell system information on a slow associated control channel or a fast associated control channel comprises: receiving at least one message containing neighbour cell system information.

Paragraph 53. Another broad aspect of the disclosure provides the method of paragraph 52 wherein receiving a message containing neighbour cell system information in support of call re-establishment comprises: receiving at least one message containing an aggregate of selected fields of a plurality of SI blocks for at least one neighbour cell.

Paragraph 54. Another broad aspect of the disclosure provides the method of paragraph 52 wherein receiving at least one message containing the contents of at least one SI in respect of the serving cell and receiving at least one message containing neighbour cell system information in support of call re-establishment comprises: receiving a sequence of messages, the sequence of messages comprising a first repeating pattern of messages containing contents of at least one SI in respect of the serving cell and messages containing neighbour cell system information in support of call re-establishment.

Paragraph 55. Another broad aspect of the disclosure provides the method of paragraph 54 wherein receiving at least one message containing the contents of at least one SI in respect of the serving cell and receiving at least one message containing neighbour cell system information in support of call re-establishment comprises: receiving a sequence of messages, the sequence of messages comprising a second repeating pattern of messages containing contents of at least one SI in respect of the serving cell and messages containing neighbour cell system information in support of call re-establishment; wherein the second repeating pattern differs from the first repeating pattern and is used at times distinct from times used for the first repeating pattern.

Paragraph 56. Another broad aspect of the disclosure provides the method of any one of paragraphs 50 to 55 wherein the neighbour cell system information comprises at least one of:

Cell Channel Description IE (information element) of each cell (16 octets, 44.018 Section 10.5.2.1b), Control Channel Description IE of each cell (3 octets, 44.018 Section 10.5.2.11), Cell Selection Parameters IE of each cell (3 octets, 44.018 Section 10.5.2.4), RACH control parameter IE of each cell (3 octets, 44.018 Section 10.5.2.29), and Location Area Identification IE of each cell (5 octets, 24.008 Section 10.5.1.3).

Cell Options (BCCH) of each cell (1 octet, 44.018 Section 10.5.2.3),

Cell Identity for each cell (2 octets, 24.008 Section 10.5.1.1).

Paragraph 57. Another broad aspect of the disclosure provides the method of any one of paragraphs 50 to 56 further comprising: storing the received neighbour cell system information; identifying the cells having an enabled call re-establishment feature; arranging the cells identified as having an enabled call re-establishment feature according to signal level measurements; after a radio link failure, making a request to a best neighbour cell as identified according to signal level measurements.

Paragraph 58. Another broad aspect of the disclosure provides a mobile station configured to implement the method of any one of paragraphs 18 to 38 and 50 to 57.

Paragraph 59. Another broad aspect of the disclosure provides one or more network components configured to implement the method of any one of paragraphs 1 to 17 and 39 to 49.

Paragraph 60. Another broad aspect of the disclosure provides a computer readable medium having computer executable instructions stored thereon which when executed by a mobile station cause the mobile station to execute the method of any one of paragraphs 18 to 38 and 50 to 57.

Paragraphs 61. Another broad aspect of the disclosure provides a computer readable medium having computer executable instructions stored thereon which when executed by one or more network components cause the one or more network components to execute the method of any one of paragraphs 1 to 17 and 39 to 49.

A network may only allow for call re-establishment within a short time of RLF. The chances of successful call re-establishment can be enhanced by minimizing the amount of time taken for various steps in the call re-establishment process.

An aspect which consumes time during this phase is acquiring the relevant system information for one or more potential target cells.

In conventional systems, SI blocks are transmitted by the serving cell and contain system information in respect of the serving cell. Various embodiments are provided all of which involve a serving cell transmitting neighbor information in respect of one or more neighbour cells.

Circuit-Switched MS-initiated Neighbour Cell System Information Acquisition

Methods, mobile stations, network components such as base stations, and computer readable media with computer executable instructions stored thereon are provided to allow a MS to acquire SI of neighbour cells during a voice call in Circuit-switched (CS) only mode, using a request/response procedure on the current serving cell to ask the network for the required neighbour cell SI. Advantageously, this approach to neighbour cell SI acquisition works in CS-only mode. In addition, because the MS can request the particular SI it needs for each neighbour cell, this approach inherently has sufficient flexibility to be adapted for future uses. There are potentially other reasons why a MS would want to acquire neighbour cell SI during a voice call. It is noted that these methods may also be used for a MS that has both CS and PS (packet switched) traffic, although the second method described below may be more efficient for a MS in such a state.

The method will first be described by way of example with reference to FIG. 1. FIG. 1 shows the interaction between a mobile station 50, a serving cell 52, and a target cell 54. At 60, there is an ongoing voice call established between the MS 50 and the serving cell 52 (although the other end of the voice call would typically be elsewhere, not shown). At 62, the serving cell transmits SACCH blocks, typically periodically, which are received as "good SACCH blocks" by the mobile station 50. The MS maintains a radio link counter S which is incremented or decremented based on whether the SACCH blocks are successfully received. Reference to a "cell transmitting" something refers to some network equipment making a transmission, for example a cell controller, such as a base station subsystem (BSS) which might, for example, have base station transceiver (BTS) and base station controller (BSC).

At 64, the MS decides that neighbour cell information is required. This decision can be based on one or more implementation-specific criteria. Various specific non-limiting examples are provided below. At 66, while the voice call is ongoing, the mobile station 50 transmits an NCELL SI (neighbour cell system information) request using a FACCH (fast associated control channel). Details of an example NCELL SI request are provided below. More generally, any message transmitted for the purpose of obtaining neighbour cell system information may be employed. At 68, the serving cell 52 responds with an NCELL SI response using FACCH. Details of an example NCELL SI response are provided below. More generally, any message transmitted for the purpose of providing neighbour cell information may be employed. At 70, the mobile station sorts and stores Ncell information.

At 72, another "good SACCH block" is transmitted followed by a series of "bad SACCH blocks" which results in the RLT counter being decremented until when S=0. "bad SAACH blocks" are those that the mobile station did not successfully receive. The particular sequence of "good" and "bad" blocks is an example only. There may be one, some, many, or even no good SACCH blocks before the "bad" ones start. It is also possible that there are good blocks mixed in with the bad ones. The MS stops using the traffic channel as indicated at 74, and the mobile station initiates a call re-establishment procedure. At 76, the call re-establishment procedure having been triggered, no neighbour cell SI acquisition is required due to the previous NCELL SI exchange. Call re-establishment signalling is performed as indicated at 80. In the specific example depicted, this includes: the MS 50 transmitting a Channel Request (cause: Call Re-establishment); the target cell 54 responding with an Immediate Assignment; the MS 50 transmitting a CM Re-establishment Request to a selected target cell 54 (which may be the same as the serving cell 52); the target cell 54 responding with a CM Service Accept. Then, as indicated at 82, the voice call is re-established. Other steps or completely different steps may be performed as part of the call re-establishment signaling.

Note that the timing illustrated for the NCELL SI request 66 with respect to the good SAACH blocks 62 and the following SACCH blocks 72 is for the purpose of example only, and may differ depending on the criteria or criterion used to determine that neighbour cell system information is required. The bad SACCH blocks are not required to start after the NCELL SI REQUEST/RESPONSE. For example, it could be possible that the responses are being received at around the same time that the MS receives bad SACCH blocks. In a practical implementation, it may be favorable to avoid this where possible as the responses might also be bad.

In some embodiments, the MS sends the neighbour cell system information request message to the current serving cell using a control channel that steals speech frames from the voice channel when necessary to transmit the neighbour cell SI request message. Such a channel may, for example, be used to transmit speech frames periodically, for example every 20 ms. Then, when there is control information to send, rather than transmitting a speech frame, a control frame is sent. The frame is stolen in the sense that the speech frame that would have been sent is never sent, the capacity to send it having been used instead for the control frame. An example of such a channel is the Fast Associated Control Channel (FACCH) referred to above, although the FACCH does not necessarily steal speech frames if it is used during a period of silence on the uplink voice channel. The FACCH is introduced in 3GPP TR 21.905. The channel block size and modulation, etc. are defined in 3GPP TS 45.003.

More generally, the MS uses a control channel that is available during a CS-only call. The SACCH is another example of a control channel that is available during a CS-only call. The SACCH does not steal frames from the voice channel and is generally more robust to channel conditions than FACCH; however it has allows only a low rate of data transfer and has a higher latency than FACCH.

In some embodiments, the serving cell sends the neighbour cell system information response message to the mobile station using a control channel that steals speech frames from the voice channel when necessary to transmit the message. An example of such a channel is the FACCH referred to previously, although the FACCH does not necessarily steal speech frames if it is used during a period of silence on the downlink voice channel.

More generally, the serving cell uses a control channel that is available during a CS-only call. The Slow Associated Control Channel (SACCH) is another example of a control channel that is available during a CS-only call. The SACCH does not steal frames from the voice channel.

Any format of the neighbour cell SI response can be employed. Several alternatives are provided for segmenting/assembling the neighbour cell system information messages on FACCH as follows:
 Transmitting messages individually and using LAPDm segmentation;
 Using concatenation/segmentation methods applied for Packet Neighbour Cell Data (3GPP TS 44.060).

In some embodiments, the FACCH is used, and the base station schedules the downlink FACCH in frames in which there is downlink discontinuous transmission of the speech signal where possible.

The following is an example of a procedure that may be executed by the MS after receiving neighbour cell system information:
 1) Store the neighbour cell system information in memory.
 2) Based on the received system information, identify the cells having an enabled Call Re-Establishment feature. For example, if the SI blocks defined in 3GPP TS 44.018 are used, enablement of a call re-establishment feature is indicated with a RE (re-establishment) flag in the RACH Control Parameters IE (defined in 3GPP TS 44.018), that is carried in SI blocks type 1, 2, 2bis, 3, and 4. Note that the SI may be needed for more than just identifying the support of CRE. There are a number of parameters that may be needed to connect to a cell. An example of a list is provided below.

3) Arrange the cells identified in step 1) according to the signal level measurements.

4) After RLF, make a RACH Channel Request with cause: Call Re-establishment to the best neighbour cell (as identified in step 3). This can be done without listening, or by refraining from listening, for the BCCH (broadcast control channel) data of neighbour cells. In particular, there is no need to listen to the BCCH of the best neighbour cell (i.e., the one to which the Channel Request is being sent).

Packet Switched MS-Initiated Neighbour Cell SI Acquisition

Methods, mobile stations, network components such as base stations, and computer readable media with computer executable instructions stored thereon, are provided to allow a MS to acquire system information of neighbour cells while engaged in a packet switched session or both a circuit-switched voice call and a packet switched session using a request/response procedure on the current serving cell to ask the network for the required neighbour cell system information. In GSM, the mode providing CS and PS connectivity is referred to as Dual Transfer Mode (DTM). Advantageously, because this method uses a packet switched channel such as a PACCH (packet associated control channel), as opposed to FACCH, there is no potential for audio gaps. Because the MS can request the particular SI it needs for each neighbour cell, this approach inherently has sufficient flexibility to be adapted for future uses. For purposes other than CRE, a voice call may not be required. There are potentially other reasons why a MS would want to acquire neighbour cell SI during a voice call or while in a PS-only mode.

Figure 2:
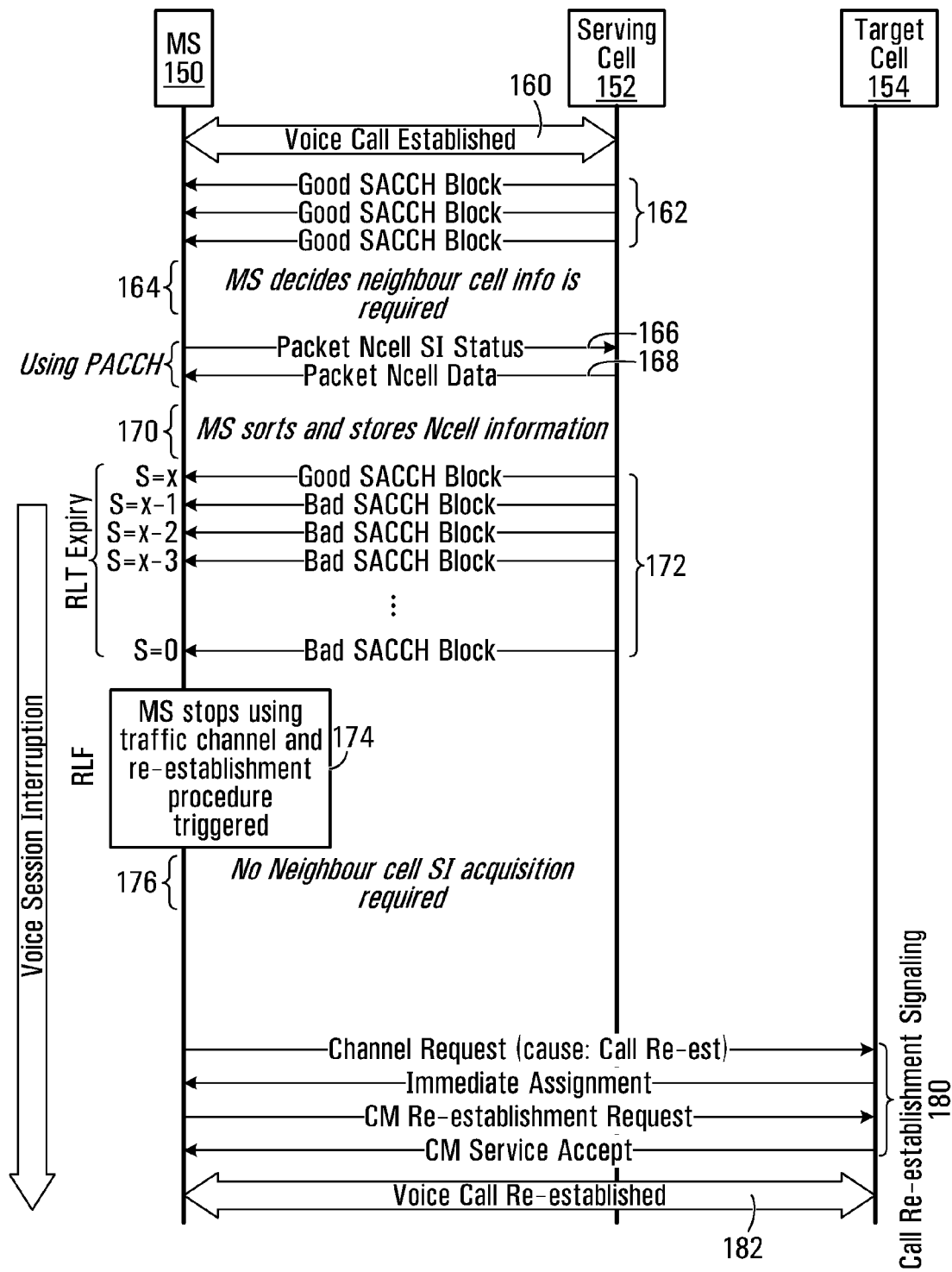
FIG. 2 depicts a second method of a mobile station obtaining neighbour cell information in advance.

The method will first be described by way of example with reference to FIG. 2. FIG. 2 shows the interaction between a mobile station 150, a serving cell 152, and a target cell 154. At 160, there is an ongoing voice call established between the MS 150 and the serving cell 152 (although the other end of the voice call would typically be elsewhere, not shown). There is also a packet switched session (not shown). At 162, the serving cell transmits SACCH blocks, typically periodically, which are received as "good SACCH blocks" by the mobile station 150.

At 164, the MS decides that neighbour cell information is required. This decision can be based on one or more implementation-specific criteria. Various specific non-limiting examples are provided below. At 166, while the voice call is ongoing, the mobile station 150 transmits a Packet NCELL SI status message using a PACCH (packet associated control channel). Details of an example Packet NCELL SI status message are provided below. More generally, any packet switched message transmitted for the purpose of obtaining neighbour cell system information may be employed. At 168, the serving cell 152 responds with a Packet NCELL Data response using a PACCH. Details of an example Packet NCELL data response are provided below. More generally, any packet switched message transmitted for the purpose of providing a response containing neighbour cell system information may be employed. At 170, the mobile station sorts and stores Ncell information.

At 172, another "good SACCH block" is transmitted followed by a series of "bad SACCH blocks" which result in the RLT counter being decremented until when S=0. As in the previous example, the particular sequence of "good" and "bad" blocks is an example only. There may be one, some, many, or even no good SACCH blocks before the "bad" ones start. It is also possible that there are good blocks mixed in with the bad ones. The mobile station stops using the traffic channel as indicated at 174, and the call re-establishment procedure is triggered. At 176, the call re-establishment procedure having been triggered, no neighbour cell SI acquisition is required due to the previous packet NCELL SI exchange. Call re-establishment signalling is performed, for example, as indicated at 180. Then, as indicated at 182, the voice call is re-established.

Note that the timing of the Packet NCELL SI request 166 with respect to the Good SACCH blocks 162 and the following SACCH blocks 172 is for the purpose of example only, and may differ depending on the criteria or criterion used to determine that neighbour cell information is required. The bad SACCH blocks are not required to start after the packet NCELL SI REQUEST/RESPONSE. For example, it could be possible that the responses are being received at around the same time that the MS is receiving bad SACCH blocks.

The MS sends the request for neighbour cell system information to the current serving cell using a control channel using the Packet-switched session. A specific example of such a control channel is the PACCH as defined in 3GPP TS 44.060.

In some embodiments a PACKET NCELL SI STATUS message defined as follows is used.

Packet Ncell SI Status

This is an example of a message that may be sent on the PACCH by the mobile station to the network in dual transfer mode or packet transfer mode to request the network to send system information relating to up to some number, for example six, neighbour cells.

| Message type: | PACKET NCELL SI STATUS |
|---|---|
| Direction: | mobile station to network |

| PACKET NCELL SI STATUS information elements |
|---|
| < Packet NCell SI status message content > ::= <br>   < Global TFI : < Global TFI IE > > <br>   < BA_USED : bit > <br>   < NCELL_COUNT : bit (3) > <br>   { NCELL_SI_REQUEST : < Neighbour Cell SI Request struct > } * (val(NCELL_COUNT)) <br>   < padding bits >; <br> < Neighbour Cell SI Request struct > ::= <br>   {0 < ARFCN : bit (10) >  \| 1 < FREQUENCY : bit (6) >} <br>   { 0 \| 1 < BSIC : bit (6) > } <br>   { 0                -- all SI requested <br>   \| 1 < REQUESTED_SI : bit (9) > }; |

| PACKET NCELL SI STATUS information element details |
|---|
| Global TFI <br> This information element contains the TFI of the mobile station's downlink TBF or uplink TBF. <br> BA_USED (1 bit field) <br> If one or more neighbour cells is identified by reference to a neighbour cell list, such as a BA (BCCH Allocation) (list), this field shall contain the value of the BA_IND in the message defining the used Neighbour Cell list. <br> NCELL_COUNT (3 bit field) <br> This field contains the number of neighbour cells for which system information is requested. If set to '0' the message indicates that all previously requested system information has been received. <br> ARFCN (10 bit field) <br> This field contains the BCCH frequency of the new cell. This field is encoded as the ARFCN defined in 3GPP TS 44.018. <br> FREQUENCY (6 bit field) <br> This field indicates the frequency/cell upon which the measurement was made. The field is an index into the resulting Frequency/Cell List for NC measurements. <br> BSIC (6 bit field) <br> This field indicates the BSIC of the frequency upon which the measurement was made. This field shall be included only | for frequencies that refer to the BA (BCCH) list. The field is encoded as the BSIC value defined in 3GPP TS 44.018.
Range 0 to 63
REQUESTED_SI (9 bit field)
Each bit in this field corresponds to a particular system information message. If the bit is set to '1', the mobile requests that the network send that message for the identified cell. If the bit is set to '0', the mobile is not requesting that system information message.

| Bit number | System information message |
|---|---|
| 0 | System Information Type 1 |
| 1 | System Information Type 2 |
| 2 | System Information Type 3 |
| 3 | System Information Type 4 |
| 4 | System Information Type 7 |
| 5 | System Information Type 8 |
| 6 | System Information Type 13 |
| 7 | spare (network shall ignore if set to '1') |
| 8 | spare (network shall ignore if set to '1') |

In some embodiments, the mobile station, having received all requested neighbour cell system information, transmits at the earliest opportunity a PACKET NCELL SI STATUS message indicating that no information is requested (i.e. NCELL_COUNT=0).

The network sends the packet neighbour cell system information response message to the mobile station using a control channel using the Packet-switched session. A specific example of such a control channel is the PACCH. In the embodiment illustrated, the packet neighbor cell system information response is in the form of the Packet Neighbour Cell Data message defined in 3GPP TS 44.060 sub-clause 11.2.9e containing system information of the requested neighbour cells. That message is normally transmitted in response to an indication from a mobile station that the mobile station is going to change cells. The encoding, decoding and storage of information received by PACKET NEIGHBOUR CELL DATA messages is as specified in sub-clause 8.8.1. with the additional requirement that at least the first PACKET NEIGHBOUR CELL DATA message for a given neighbour cell shall include the BCCH ARFCN (absolute radio frequency channel number) and BSIC (base station identity code). Alternatively, a message defined specifically for this purpose may be employed.

The Packet Neighbour Cell Data message, for example, may be defined as follows:

| Packet Neighbour Cell Data information elements |
|---|
| < Packet Neighbour Cell Data message content > ::= <br>    < PAGE_MODE : bit (2) > <br>    { 0 < Global TFI : < Global TFI IE > > <br>    {    < CONTAINER_ID : bit (2) > <br>       < spare : bit (1) <br>         < CONTAINER_INDEX : bit (5) > <br>         { 0 \| 1 < ARFCN : bit (10) > <br>           < BSIC : bit (6) > } <br>         < CONTAINER : < Container repetition struct > > <br>           < padding bits > <br>            ! < Non-distribution part error : bit (*) = < no string > > } <br>           ! < Address information part error : bit (*) = < no string > > } <br>           ! < Distribution part error : bit (*) = < no string > > ; <br><br> < Container repetition struct > ::= <br>    { <br>       {    < PD : bit (3) > <br>           < CD_LENGTH : { bit (5) exclude 00000 exclude 11111 } > <br>           < CONTAINER_DATA : octet (val(CD_LENGTH)) > -- Final container segment. Next container follows. <br>       \|    < PD : bit (3) > <br>           < CD_LENGTH : { bit (5) := 11111 } <br> > <br>           < CONTAINER_DATA : octet ** > } ** <br> -- Container continued in next message. <br>       {    < spare bit (3) > <br> -- Repetition of the container repetition struct continues until: <br>           < CD_LENGTH : { bit (5) := 00000 } <br> > }    -- A) val(CD_LENGTH) = 0 or <br>    } // ; <br> -- B) end of PNCD message. |

| Packet Neighbour Cell Data information element details |
|---|
| The Packet Neighbour Cell Data message consists of up to 32 instances and contains neighbour cell system information messages from either the BCCH or from the PBCCH or from both. Each container repetition struct contains information from one or more SI/PSI message. One SI/PSI message can be distributed over more than one instance. <br> A container may have the cell identity represented by the ARFCN and BSIC included. <br> PAGE_MODE (2 bit field) <br> This field is defined in sub-clause 12.20 and gives the PAGE_MODE parameter valid in the serving cell. <br> Global TFI <br> This information element contains the TFI of the mobile station's downlink TBF or uplink TBF. This field is defined in sub-clause 12.10. <br> CONTAINER_ID (2 bit field) <br> This field contains the Container identity and shall have the same value in all instances to form a complete set of neighbour cell system information for a certain cell. <br> Value range: 0-3. <br> Spare (1 bit field) <br> This bit is reserved for future use. <br> CONTAINER_INDEX (5 bit field) <br> This field contains the message index within a complete set of neighbour cell system information for a certain cell <br> Value range: 0-31. <br> ARFCN and BSIC <br> ARFCN and BSIC is optional, but if included their value shall be same in all instances forming a complete set. If not the same, the mobile station shall act as described in sub-clause 8.8.1. <br> ARFCN (10 bit field) <br> This field indicates the ARFCN of the BCCH of the neighbour cell for which the information contained in this message is valid for. This field is encoded as the ARFCN defined in 3GPP TS 44.018. <br> Range 0 to 1023 <br> BSIC (6 bit field) <br> This field indicates the BSIC of the neighbour cell for which the information contained in this message is valid. This field is encoded as the BSIC value defined in 3GPP TS 44.018. <br> Range 0 to 63. <br> PD (3 bit field) <br> This field contains a protocol discriminator and indicates the origin of the contained message. |

| bit 2 1 0 | |
|---|---|
| 0 0 0 | BCCH (LAPDm); |
| 0 0 1 | PBCCH (RLC/MAC); |
| 0 1 0 | Reserved; If received, the contents of the container shall be discarded. |
| ... | |
| 1 1 1 | Reserved; If received, the contents of the container |

-continued

```
    shall be discarded.
CD_LENGTH (5 bit field)
This field indicates the number of CONTAINER DATA octets
that forms a specific SI/PSI message and is coded as shown
below.

bit
5 4 3 2 1

0 0 0 0 0    No CONTAINER DATA follows; Spare padding is used
             to fill the rest of the message;
0 0 0 0 1    CONTAINER DATA length = 1 octet;
. . .
1 0 0 1 0    CONTAINER DATA length = 18 octets;
1 1 1 1 1    The remaining portion of the Packet Neighbour
             Cell Data message is used by the associated
             CONTAINER DATA. The message continues in a
             subsequent instance of the Packet Neighbour Cell
             Data message, in the next CONTAINER DATA with the
             same Protocol Discriminator value as the current
             one.
All other values reserved. If a reserved value is received,
the contents of the container shall be discarded.
CONTAINER_DATA(n * 8 bits)
The concatenation of one or several CONTAINER_DATA octets
forms the actual contents, specific to the SI/PSI messages.
If the contained system information messages are copied
from the BCCH, the information contained in the Packet
Neighbour Cell Data message shall exclude the following
information elements from the beginning of the messages: L2
Pseudo Length; RR management Protocol Discriminator and
Skip Indicator.
If the contained system information messages are copied
from the PBCCH, the information contained in the Packet
Neighbour Cell Data message shall include the complete PSI
message.
Extra octets of padding bits at the end of the SI/PSI
messages may be excluded.
```

Network-Controlled Neighbour Cell SI Acquisition

Methods, mobile stations, network components such as base stations, and computer readable media with computer executable instructions stored thereon, are provided to allow the network to initiate the transmission of neighbour cell System Information to a MS in an ongoing voice call.

Figure 3:
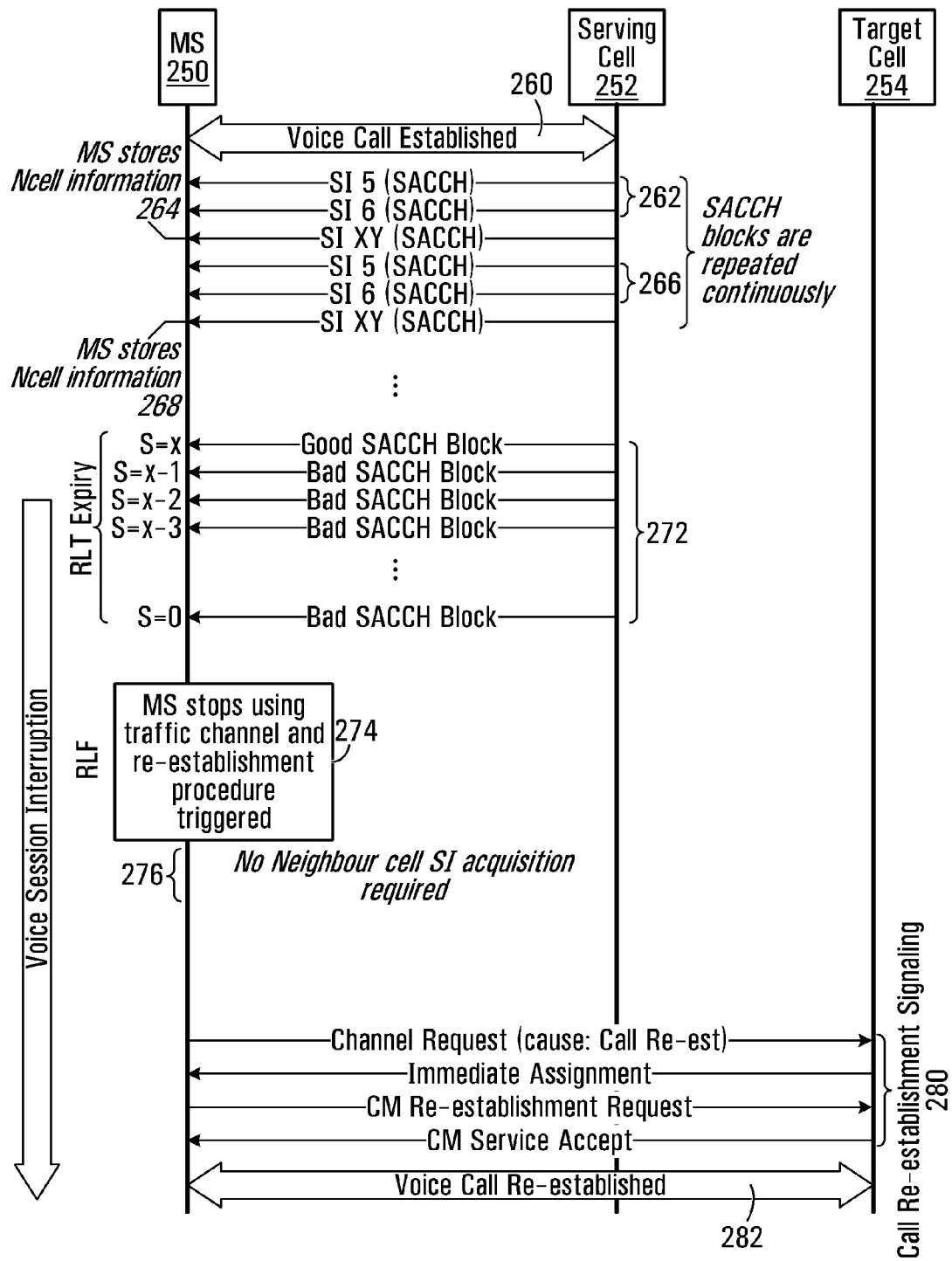
FIG. 3 depicts a third method of a mobile station obtaining neighbour cell information in advance.

The method will first be described by way of example with reference to FIG. 3. FIG. 3 shows the interaction between a mobile station 250, a serving cell 252, and a target cell 254. At 260, there is an ongoing voice call established between the MS 250 and the serving cell 252 (although the other end of the voice call would typically be elsewhere, not shown). There may or may not be a packet switched session (not shown). At 262, the serving cell transmits SACCH blocks containing System Information Type 5 (referred to as SI 5) and System Information Type 6 (referred to as SI 6) for the serving cell respectively. Note that the transmission of SI 5 and SI 6 for the serving cell is just an example. The particular SI blocks for the serving cell transmitted may depend on configuration of the network and may contain additional, or completely different, SI messages. At 264, the serving cell transmits at least one SACCH block containing neighbour cell system information. In the illustrated example, this is referred to as a SACCH block containing SI XY, where SI XY is a newly defined message that contains neighbour cell system information that may for example, be in support of call re-establishment, and which may, for example, be used by the mobile station for call re-establishment purposes, or for other purposes. At 266, the serving cell transmits SACCH blocks containing SI 5 and SI 6 for the servicing cell respectively. At 268, the serving cell transmits another SAACH block containing SI XY. In the illustrated example, the process of transmitting SI 5 and SI 6 for the service cell followed by SI XY is repeated. More generally, the sequence of transmission of SI blocks for the serving cell, and SI blocks containing neighbour cell system information can vary, and the selection of which SI blocks for the serving cell to transmit can also vary. For example, in at least one existing network configuration, the downlink SACCH is used for transmitting SI5, SI5bis, SI5ter, SI6, measurement information and for SMS during a voice call. In some embodiments, two or more SACCH blocks are used to transmit the neighbour cell system information for a given neighbour cell. A specific example is given below.

At step 272, another "good SACCH block" is transmitted followed by a series of "bad SACCH blocks" which result in the decrementation of the RLT counter until when S=0, the MS stops using the traffic channel indicated at 274, and the call re-establishment procedure is triggered. As in the previous example, the particular sequence of "good" and "bad" blocks is an example only. There may be one, some, many, or even no good SACCH blocks before the "bad" ones start. It is also possible that there are good blocks mixed in with the bad ones. The blocks transmitted as part of step 272 would conform with the pattern described previously for blocks 262, 264,266,268. At 276, the call re-establishment procedure having been triggered, no neighbour cell SI acquisition is required due to this having already taken place as part of the network SACCH transmissions. Call re-establishment signalling is performed as indicated at 280. Then, as indicated at 282, the voice call is re-established.

In some embodiments, the transmission of SACCH blocks containing neighbour cell system information is done on an ongoing basis. Alternatively, one or more criteria may be applied by the network in deciding whether to transmit system information for neighbour cells, and/or for which neighbour cells.

In some embodiments, the parameters that are transmitted for a given neighbour cell include an aggregate of parameters that would normally be included in one or more SI messages for the neighbour cell, and would normally be transmitted by the neighbour cell.

Specific Parameters Example

In a specific example, the aggregate of parameters includes:

Control Channel Description IE (information element) of each cell (3 octets, 3GPP TS 44.018 Section 10.5.2.11), Cell Selection Parameters IE of each cell (3 octets, 3GPP TS 44.018 Section 10.5.2.4), RACH control parameter IE of each cell (3 octets, 3GPP TS 44.018 Section 10.5.2.29), and Location Area Identification IE of each cell (5 octets, 3GPP TS 24.008 Section 10.5.1.3).

Cell Options (BCCH) of each cell (1 octet, 3GPP TS 44.018 Section 10.5.2.3),

Cell Identity for each cell (2 octets, 3GPP TS 24.008 Section 10.5.1.1),

Cell Channel Description IE (information element) of each cell (16 octets, 3GPP TS 44.018 Section 10.5.2.1b).

In a specific example, a pair of new SACCH messages are defined for transmission of the neighbour cell system information of a given neighbour cell. The two messages are referred to herein for convenience as SI XY and SI XYbis although of course the naming used can be implementation specific. The SI XY and SI XYbis messages contain a set of parameters which will help the MS to make a RACH request for Call Re-establishment if required. This can, for example, be an aggregate of parameters from various other SI messages and from one or more different neighbour cells for call re-establishment. In a specific example, the first six specific parameters listed above are included in SI XY, and the seventh specific parameter listed above is included in SI XYbis.

In some embodiments, each cell is identified in the SACCH block containing neighbour cell system information, for example by the ARFCN of its BCCH carrier and/or BSIC. In order to transmit the above IEs for each neighbour cell of a set of multiple cells, a respective SI XY and SI XYbis message is transmitted for each cell. In some embodiments, an SI XYbis message always follows an SI XY message such that the XYbis message need not contain an identifier of the neighbour cell. In some embodiments, an SI XYbis message that follows an SI XY message need not be in respect of the same neighbour cell, in which case both the SI XY and SI XYbis messages will contain neighbour cell identification.

In some embodiments, after transmitting an SI XY message and an SI XYbis message, no SI XY or SI XYbis message is transmitted for at least some defined number of SACCH blocks, for example three.

The following is an example of MS behavior after receiving neighbour cell system information:
1) Store the neighbour cell's system information in memory.
2) Identify the cells having an enabled Call Re-Establishment feature (identified for example by the RACH control parameter IE).
3) Arrange the cells identified in step 1 according to the signal level measurements.
4) After RLF, make a RACH request to the best neighbour cell (as identified in step 3) without listening, or by refraining from listening, for the BCCH data in the neighbour cell.

In some embodiments, to provide better utilization of the radio channels, the serving cell is configured to use one or more of the following criteria for the transmission of the messages containing neighbour cell system information on the SACCH:
(a) Scheduling the transmission of these messages based on the channel quality reported by the MS in a measurement report; and/or
(b) Managing the content of these messages dynamically based on the neighbour cells reported by the MS in its measurement report (e.g., by scheduling the transmission of neighbour cell system information such that the MS receives the information for strongest cells first).

In some embodiments, the network controls SI XY distribution such that only a MS which is capable of processing and making use of SI XY would receive the SI XY message on its SACCH. This may for example involve the mobile station transmitting a "MS indication of support for the network-initiated broadcast of SI". In other embodiments, the network sends the SI XY message in the SACCH to all devices regardless their capability. Devices that do not support the capability will simply ignore the messages.

In some embodiments, repeated SACCH is employed, such that each SI is sent twice in a row (to enable SACCH combining in bad radio conditions).

In some embodiments, where the network has a large number of SI XY instances to transmit, the network in some instances re-schedules the SACCH transmission pattern to allow for a larger number of SI XY instances per period. For example, a normal period could be defined containing {SI 5, SI 5bis, SI 6, SI XY or SI XYbis, SI 5, . . . } and an SI XY-centric period could be defined with one instance of SI5, SI 5bis, SI6 and three instances of SI XY or SI XYbis per period {SI 5, SI 5bis, SI 6, SI XY or SI XYbis, SI XY or SI XYbis, SI XY or SI XYbis, SI 5 . . . }.

In the above-described embodiment, the neighbour cell system information is sent on the SACCH. In another embodiment, similar information is instead sent on the FACCH.

In yet another embodiment, similar information is sent on the PACCH. This differs from the use of the PACCH to transmit neighbour cell system information using the Packet Neighbour Cell Data message in that it is sent without either receiving a cell change notification indication from the mobile station, or being associated with a subsequent handover command or cell change order transmitted by the network. In addition, in some embodiments, where an agregate of system information from several SIs is prepared, for example specifically for call re-establishment, the data sent on the PACCH would be different from that sent in a Packet Neighbour Cell Data message, which includes only complete (not partial) copies of system information messages that would be sent in a neighbour cell.

Further Variations on One or More of Above-Described Embodiments

In the embodiments described above with reference to FIGS. 1, 2 and 3, the mobile station 50, 150, 250 proceeds to step 78, 178, 278 without, or by refraining from, performing any further SI acquisition. More generally, the method need not necessarily preclude the mobile station 50 from performing further SI acquisition, for example using conventional methods. For example, in case the network is not able to provide the requested SI for a CRE candidate cell a "legacy" re-establishment procedure (with cell information reading) could be attempted for the cell ranking first in terms of best radio condition, this involving listening to SI from the broadcast channel of the selected cell until all of the critical SI is gathered.

MS-Dependent Criteria for Requesting Neighbour Cell Information

For embodiments involving MS-initiated neighbour cell information acquisition, any appropriate mechanism for the MS to decide how much neighbour cell system information to request, and when to request it, can be defined.

In embodiments in which speech frames are stolen to transmit the request and/or the response, the MS implementation may weigh speech quality versus the necessity of having neighbour cell system information.

In some embodiments, the MS is configured to request system information only for a predetermined number (one or two for example) of neighbour cells which have the highest signal strength and/or quality. These cells are the most likely candidates to be the target cell in the case of a call re-establishment.

In case of a cell change, it will often be the case that the system information related to a given neighbour cell will not have changed since being obtained by the MS in a previous cell. In some embodiments, the MS is configured to make requests for neighbour cell system information in an efficient manner after a cell change. For example, after a handover, the MS determines whether there is a "same" neighbour cell (for example, with the same BCCH ARFCN (absolute radio frequency channel number) and BSIC (base station identity code) as in the previous cell). Upon determining there is such a cell, the mobile station may decide to delay making a new neighbour cell system information request for this cell, for example until the current validity period expires. A separate validity timer may be maintained on a per-SI and per-neighbour cell basis.

In some embodiments, before deciding not to request neighbour cell system information in respect of a cell that was a neighbour both before and after a handoff, the MS determines with substantial certainty that the "same" neighbour cell is really the same cell, e.g., by comparing changes in measurements such as RSSI (received signal strength indicator), time offset, frequency offset, etc.

In some embodiments, the neighbour cell information is requested when some measurement of received signal strength for the serving cell falls below/rises above some defined threshold. In addition or alternatively, the requests can be based on the measurements of the signal strength of the neighbour cells (for example only ask for the system information of the neighbour cell once it gets above some defined threshold). More complex thresholds may also be defined, for example "above some defined threshold for some defined length of time", "neighbour cell strength above some threshold AND serving cell (quality or strength) below some threshold", etc.

Neighbour Cell System Information Request

In some embodiments, for MS-initiated approaches, the request for neighbour cell information contains the following information:

an indication of for which neighbour cells system information is being requested, for example a BCCH ARFCN and/or BSIC of each neighbour cell for which system information is being requested; and for each neighbour cell thus indicated, an indication of which system information is being requested. In some embodiments, a set of SI blocks are defined. For example, a set of standardized SI blocks are defined in 3GPP TS 44.018.

In some embodiments, the request contains an indication of which system information is being requested. The network could then determine which neighbour cells to send the information for.

In some embodiments, the system information requested by the mobile station and provided by the network is the information found in one or more of the defined SI blocks. A subset or all of the available SI blocks may be requested, for example, using a bitmap or other mechanism.

In some embodiments where SI block delivery is mobile station initiated, a specific set of parameters needs to be obtained for a call re-establishment to a given neighbour cell. An example of such a set is provided below under the heading "Specific Parameters Example". In some embodiments, the mobile station requests at least a minimum set of SI blocks necessary to obtain a valid set of parameters. For example, SI blocks 1 and 3 defined in 3GPP TS 44.018 contain the set of specific parameters listed below in addition to other information. However, if the mobile station has some valid information already, it may not be necessary to request all of the required system information for a given neighbour cell.

In some embodiments, the MS sends the request during an uplink discontinuous transmission period.

In some embodiments, the MS splits its neighbour cell system information acquisition across multiple requests, separated in time.

It should be noted that the information carried in SI XY can be used even without CRE. For example, it may enable the MS to do faster cell re-selection after normal call termination.

In some embodiments, where neighbour cell system information exchange is mobile-station initiated, rather than requesting a set of SIs by number the mobile station has the signalling capability to simply request all the SI blocks that are applicable to call re-establishment, either on a per neighbour cell basis, or for all neighbour cells. Correspondingly, the network has the capability to recognize such a request and to respond accordingly.

A similar mechanism may be employed to allow the mobile station to request all of the SI blocks that are particularly selected in support of some other defined function, either on a per neighbour cell basis, or for all neighbour cells. Correspondingly, the network has the capability to recognize such a request and to respond accordingly.

Neighbour Cell System Information Delivery

In some embodiments, the neighbour cell system information is obtained by the serving cell from the core network. The serving cell may maintain a local copy for use in providing to the MS or may act as a conduit for requests/responses to the core network.

In some embodiments, the network (for example, the serving cell BTS (base station transceiver subsystem), serving cell BSC (base station controller), or some other component) may prioritize the neighbour cell system information ordering, for example by transmitting more important system information first. This may, for example, involve transmitting the most important system information messages of the best candidate neighbour cells first.

In some embodiments, the network transmits the neighbour cell information during a downlink discontinuous transmission period.

In some embodiments, where neighbour cell system information exchange is network-initiated, the network only sends the neighbour cell information in respect of cells that have enabled call re-establishment. This may be accompanied by an indication from the network that it is only sending neighbour cell system information in respect of CRE-capable cells.

In some embodiments, where neighbour cell system information exchange is network-initiated, a specific example has been provided in which a new SI block has been defined that contains an aggregate of fields from one or more SI blocks that are particularly selected in support of call re-establishment. A similar mechanism may be employed to define such a new SI block that contains an aggregate of fields from one or more SI blocks that are particularly selected in support of some other defined function. In some embodiments, multiple such SI blocks in support of multiple functions are defined.

"No Change" Message

In some embodiments, a mechanism is provided to allow the network to respond with a short "no change" message, in order to minimize the amount of wasted bandwidth in long calls where the neighbour cell system information may be requested repeatedly. In some embodiments, the network keeps a history of what was sent to a given mobile device and when. This may involve tracking acknowledgments from the mobile device to ensure that the information was successfully received. When it is time to send information, the network obtains the newest information and compares it with what was last sent. If they are the same, it would then transmit a "no change" indication. Upon receipt of such a message, the mobile station can reset the validity of the system information previously received.

New Validity Period

Note that a current neighbour cell system information validity period is 30 seconds as defined in 3GPP TS 45.008 section 6.6.1 for system information received by listening to the BCCH of neighbor cells. If the stored information is older than 30 seconds, the MS will act as though it does not have this information. In some embodiments, a longer validity period is provided, at least for system information received through the neighbour cell request system information mechanism or through the network initiated procedures described above. A specific example of a longer validity period that might be appropriate is 180 seconds.

Support Indication

In some CS-only embodiments, for MS-initiated system information embodiments, the network has a mechanism to signal support of the neighbor cell system information Request/Response feature, in order to prevent the MS from making neighbour cell SI requests on cells which do not support it. In such embodiments, the mobile station is configured to look for such support before making a request for neighbor cell system information. A specific possibility is for this indicator to be transmitted in the System Information Type 2n message, currently defined in 3GPP TS 44.018, which could be modified to include this new indicator.

Similarly, in some PS-based embodiments, the network signals support of this feature, in order to prevent the MS from making neighbour cell system information requests on cells which do not support it. In some embodiments, a broadcast channel, such as a BCCH, is used to transmit network capabilities including the support indicators. Any signalling method may be employed. In a specific example Indication SI-13 (GPRS Cell-Options IE) could be used to carry a bit to indicate support for packet neighbor cell system information request. The following is a specific example:
PACKET_NCELL_SI_STATUS_SUPPORT (1 Bit Field)

This field indicates whether the cell supports the PACKET NCELL SI STATUS message (see sub-clause 8.11).
0 The cell does not support the PACKET NCELL SI STATUS message.
1 The cell supports the PACKET NCELL SI STATUS message.

In some systems, one or both of the CS-only and PS-based embodiments may be implemented, and a combined indicator that indicates which of these is supported is provided. For example, a two-bit value could be used to indicate "CS-only", "PS-only" or "CS-and-PS" support for neighbour cell system information request mechanism.

In some embodiments, as part of a call re-establishment procedure performed in the mobile station, unless the mobile station has stored valid system information for a given neighbour cell, for example obtained using one of the methods described above (e.g. for a particular carrier of a neighbour cell), the mobile station attempts to decode the system information broadcast by the neighbour cell, for example by attempting to decode BCCH data block containing the parameters affecting cell selection.

In some embodiments where neighbour cell system information exchange is MS-initiated, a request that does not contain, or is free of, an identification of at least one neighbour cell is treated as a request for system information for all of the neighbour cells.

In some embodiments where neighbour cell system information exchange is MS-initiated, a request that does not contain, or is free of, an indication of any specific system information is treated as a request for all of a predefined set of system information.

Figure 4:
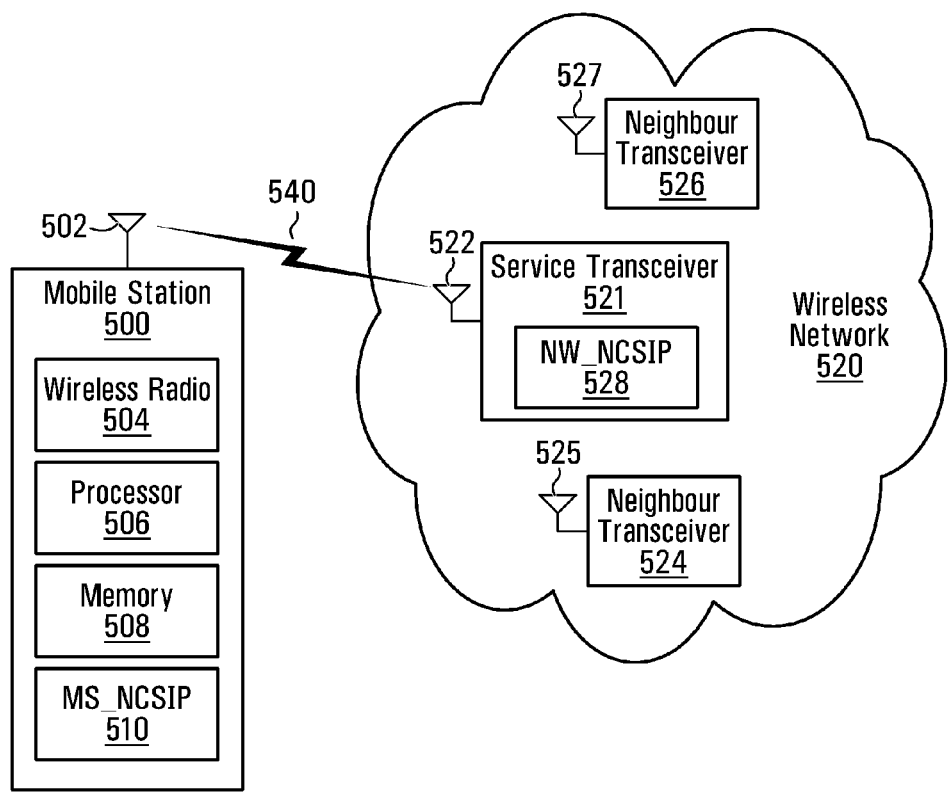
FIG. 4 is a block diagram showing a mobile station and a network.

Referring to FIG. 4, shown is a block diagram showing a mobile station 500 and a network providing wireless communication services. The mobile station 500 has at least one antenna 502, a processor 506, wireless radio 504 and device memory 508 which may include non-volatile RAM, ROM and or volatile RAM. The mobile station is shown with a single wireless radio 504, but in some embodiments, the mobile station may have multiple such wireless radios, for example if the mobile station is a multi-mode mobile station. The mobile station 500 has a MS_NCSIP (mobile station neighbour cell system information processing) module 510. Of course, the mobile station may have additional components to those shown, and the components shown may be arranged/combined/implemented differently than shown.

The mobile station 500 is configured, through inclusion of the MS_NCSIP module 510 which may be implemented in suitable hardware, firmware, and/or software stored in device memory 508, to perform any of the methods described above.

The network 520 is shown to include a serving transceiver 521 having at least one antenna 522. At the instant depicted, the mobile station 500 is obtaining wireless communications services via transceiver 521. Also shown are two neighbour transceivers 524,526 with associated antennas 525,527. Transceivers 521,525,526 may, for example for part of respective base stations. The network 520 has a NW_NCSIP (network neighbour cell system information processing) 528 responsible for implementing any of the network side methods described herein. The functionality of the NW_NCSIP may reside in the serving transceiver 521 or elsewhere in the network.

In the illustrated example, the NW_NCSIP_is implemented as software and executed on processors forming part of the network 520. However, more generally, the NW_NCSIP may be implemented as software running on appropriate tangible processing platform, hardware, firmware, or any appropriate combination thereof.

Furthermore, it is to be understood that the network 520 would have any appropriate components suitable for a network providing wireless communications services. Note that the network 520 may include wires that interconnect network components in addition to components for providing wireless communication with mobile devices. The components of the network 520 are implementation specific and may depend on the type of wireless network. There are many possibilities for the wireless network. The wireless network might for example be a GSM network.

In operation, the mobile device 500 communicates with the wireless network 520 over a wireless connection 540 between the mobile device 500 and the serving transceiver 521. The MS_NCSIP 510 of the mobile station 500 and the NW_NCSIP of the network 520 participates in the delivery of system information for neighbour cells from the network 520 to the MS 500, for example in support of call re-establishment.

Figure 5:
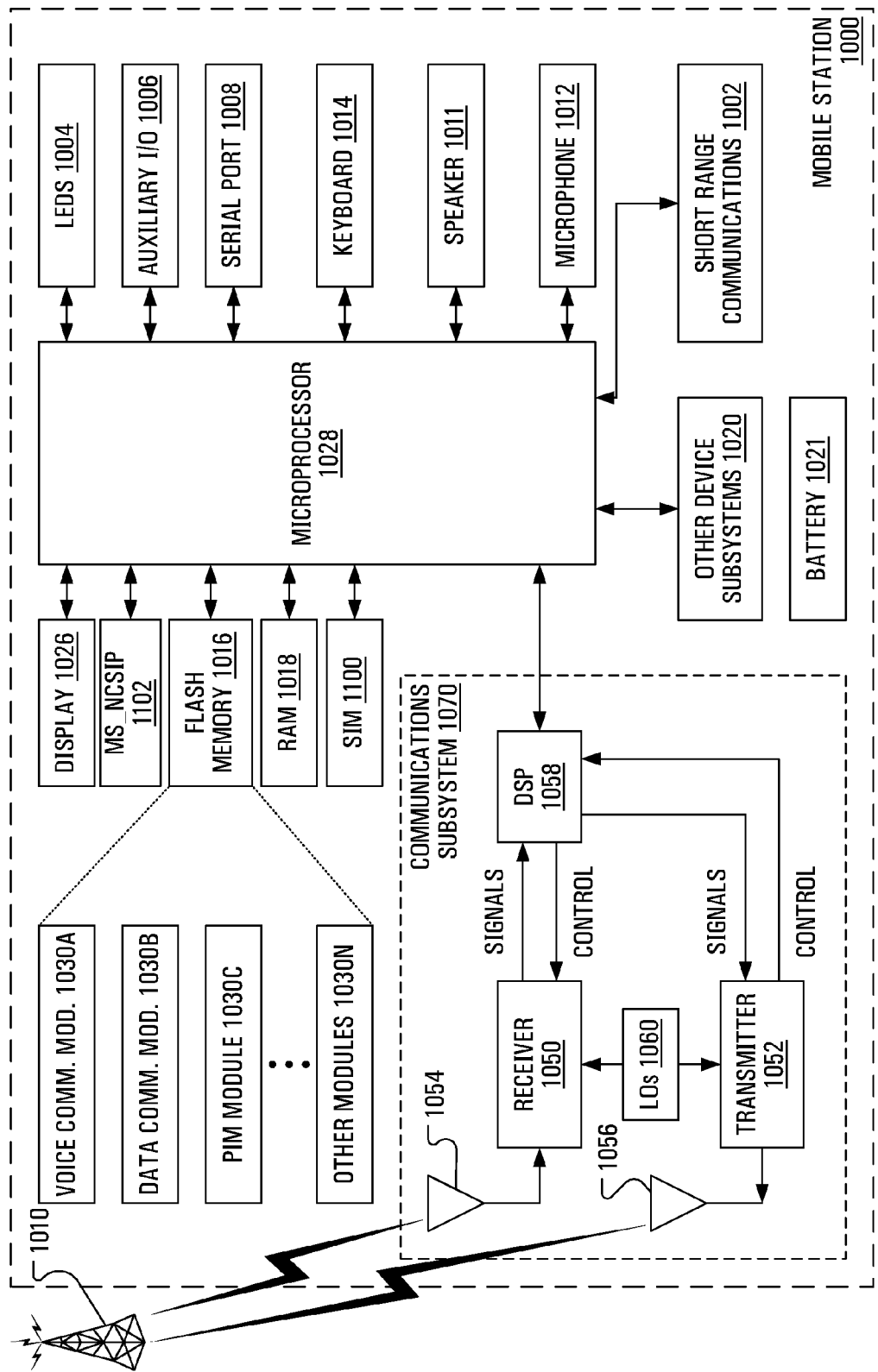
FIG. 5 is a more detailed block diagram of a mobile station.

Referring now to FIG. 5, shown is a block diagram of another mobile station 1000 that may implement mobile station related methods described herein. It is to be understood that the mobile station 1000 is shown with very specific details for example purposes only. The mobile station 1000 has a MS_NCSIP module 1102 which functions as per the MS_NCSIP module 510 of FIG. 4 described above.

A processing device (a microprocessor 1028) is shown schematically as coupled between a keyboard 1014 and a display 1026. The microprocessor 1028 controls operation of the display 1026, as well as overall operation of the mobile station 1000, in response to actuation of keys on the keyboard 1014 by a user.

The mobile station 1000 has a housing that may be elongated vertically, or may take on other sizes and shapes (including clamshell housing structures). The keyboard 1014 may include a mode selection key, or other hardware or software for switching between text entry and telephony entry.

In addition to the microprocessor 1028, other parts of the mobile station 1000 are shown schematically. These include: a communications subsystem 1070; a short-range communications subsystem 1002; the keyboard 1014 and the display 1026, along with other input/output devices including a set of LEDS 1004, a set of auxiliary I/O devices 1006, a serial port 1008, a speaker 1011 and a microphone 1012; as well as memory devices including a flash memory 1016 and a Random Access Memory (RAM) 1018; and various other device subsystems 1020. The mobile station 1000 may have a battery 1021 to power the active elements of the mobile station 1000.

The mobile station 1000 is in some embodiments a two-way radio frequency (RF) communication device having voice and data communication capabilities. In addition, the mobile station 1000 in some embodiments has the capability to communicate with other computer systems via the Internet.

Operating system software executed by the microprocessor 1028 is in some embodiments stored in a persistent store, such as the flash memory 1016, but may be stored in other types of memory devices, such as a read only memory (ROM) or similar storage element. In addition, system software, specific device applications, or parts thereof, may be temporarily loaded into a volatile store, such as the RAM 1018. Communication signals received by the mobile station 1000 may also be stored to the RAM 1018.

The microprocessor 1028, in addition to its operating system functions, enables execution of software applications on the mobile station 1000. A predetermined set of software applications that control basic device operations, such as a voice communications module 1030A and a data communications module 1030B, may be installed on the mobile station 1000 during manufacture. In addition, a personal information manager (PIM) application module 1030C may also be installed on the mobile station 1000 during manufacture. The PIM application is in some embodiments capable of organizing and managing data items, such as e-mail, calendar events, voice mails, appointments, and task items. The PIM application is also in some embodiments capable of sending and receiving data items via a wireless network 1010. In some embodiments, the data items managed by the PIM application are seamlessly integrated, synchronized and updated via the wireless network 1010 with the device user's corresponding data items stored or associated with a host computer system. As well, additional software modules, illustrated as other software module 1030N, may be installed during manufacture. In addition, the microprocessor 1028 executes SRI updating and SRI reading functions.

Communication functions, including data and voice communications, are performed through the communication subsystem 1070, and possibly through the short-range communications subsystem 1002. The communication subsystem 1070 includes a receiver 1050, a transmitter 1052 and one or more antennas, illustrated as a receive antenna 1054 and a transmit antenna 1056. In addition, the communication subsystem 1070 also includes a processing module, such as a digital signal processor (DSP) 1058, and local oscillators (LOs) 1060. The specific design and implementation of the communication subsystem 1070 is dependent upon the communication network in which the mobile station 1000 is intended to operate. For example, the communication subsystem 1070 of the mobile station 1000 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile station 1000.

Network access may vary depending upon the type of communication system. For example, in the Mobitex™ and DataTAC™ networks, mobile stations are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card 1100, in order to operate on a GPRS network.

When network registration or activation procedures have been completed, the mobile station 1000 may send and receive communication signals over the communication network 1010. Signals received from the communication network 1010 by the receive antenna 1054 are routed to the receiver 1050, which provides for signal amplification, frequency down conversion, filtering, channel selection, etc., and may also provide analog to digital conversion. Analog-to-digital conversion of the received signal allows the DSP 1058 to perform more complex communication functions, such as demodulation and decoding. In a similar manner, signals to be transmitted to the network 1010 are processed (e.g., modulated and encoded) by the DSP 1058 and are then provided to the transmitter 1052 for digital to analog conversion, frequency up conversion, filtering, amplification and transmission to the communication network 1010 (or networks) via the transmit antenna 1056.

In addition to processing communication signals, the DSP 1058 provides for control of the receiver 1050 and the transmitter 1052. For example, gains applied to communication signals in the receiver 1050 and the transmitter 1052 may be adaptively controlled through automatic gain control algorithms implemented in the DSP 1058.

In a data communication mode, a received signal, such as a text message or web page download, is processed by the communication subsystem 1070 and is input to the microprocessor 1028. The received signal is then further processed by the microprocessor 1028 for an output to the display 1026, or alternatively to some other auxiliary I/O devices 1006. A device user may also compose data items, such as e-mail messages, using the keyboard 1014 and/or some other auxiliary I/O device 1006, such as a touchpad, a rocker switch, a thumb-wheel, or some other type of input device. The composed data items may then be transmitted over the communication network 1010 via the communication subsystem 1070.

In a voice communication mode, overall operation of the device is substantially similar to the data communication mode, except that received signals are output to a speaker 1011, and signals for transmission are generated by a microphone 1012. Alternative voice or audio I/O subsystems, such as a voice message recording subsystem, may also be implemented on the mobile station 1000. In addition, the display 1016 may also be utilized in voice communication mode, for example, to display the identity of a calling party, the duration of a voice call, or other voice call related information.

The short-range communications subsystem 1002 enables communication between the mobile station 1000 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 6:
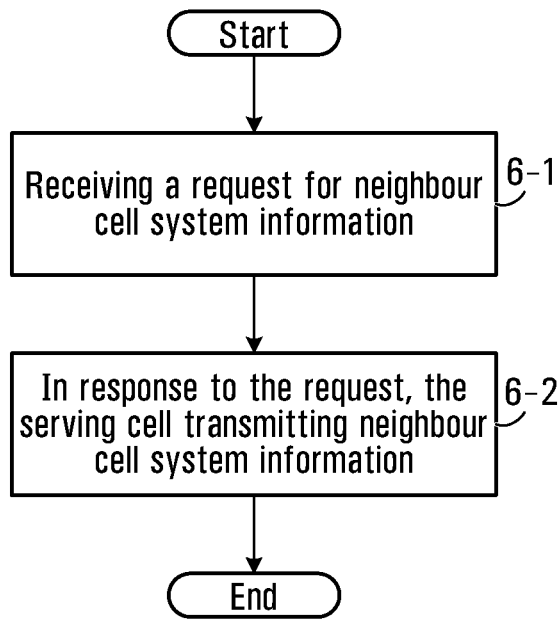
FIG. 6 is a flowchart of a first method of a network providing neighbour cell information.

Referring now to FIG. 6, shown is a flowchart of a method for execution by a serving cell on the network. The method begins at block 6-1 with receiving a request for neighbour cell system information. Following this, the method continues in block 6-2 with in response to the request, transmitting neighbour cell system information. The serving cell may generate the response on its own, or it may forward the request on to another network component, and then after a response is received from the network component, the serving cell forwards some or all of the requested information to the mobile station. In some embodiments, the request is received over a control channel available to a mobile station in circuit switched-only mode. Examples include the FACCH and the SACCH. In other embodiments, the request is received over a packet switched control channel available to a mobile station having a packet switched connection. An example includes the PACCH.

Figure 7:
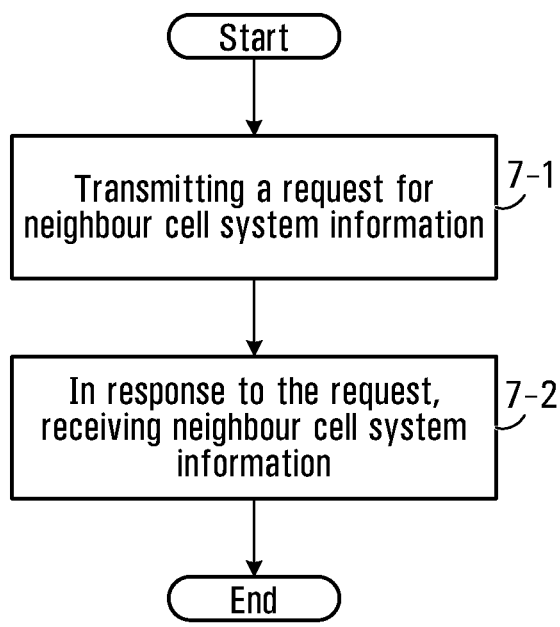
FIG. 7 is a flowchart of a method of a mobile station requesting neighbour cell system information and receiving the neighbour cell system information response.

A corresponding method for implementation for a mobile station will now be described by way of example with reference to FIG. 7. The method begins at block 7-1 with transmitting a request for neighbour cell system information. The method continues at block 7-2 with in response to the request, receiving neighbour cell system information.

The control channel may be a control channel having any of the types described above with reference to FIG. 6.

In some embodiments, the method further includes storing the received neighbour cell system information in memory. In some embodiments, the method further includes initiating call re-establishment after radio link failure. In some embodiments, initiating call re-establishment after radio link failure is performed without, or by refraining from, waiting to receive system information on broadcast channels from neighbour cells.

Figure 8:
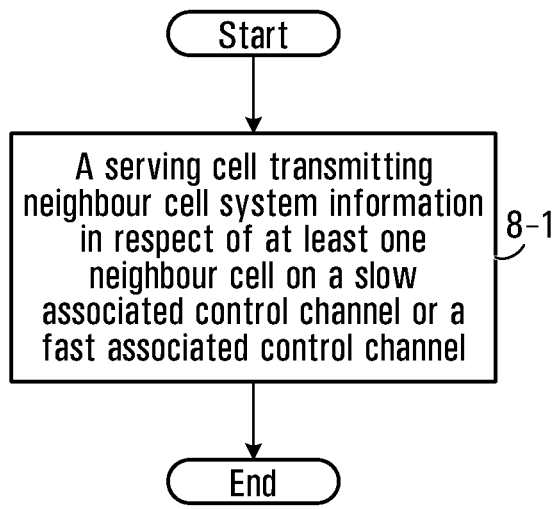
FIG. 8 is a flowchart of a method of a serving cell transmitting neighbour cell system information.
Figure 9:
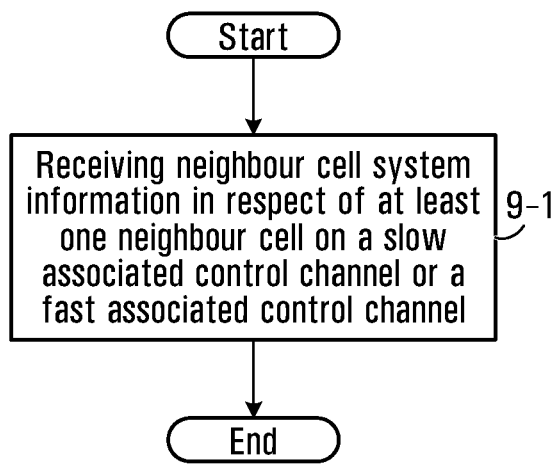
FIG. 9 is a flowchart of a method of receiving neighbour cell system information.

Another network implemented method will now be described with reference to the flowchart of FIG. 8. The method includes block 8-1 which involves a serving cell transmitting neighbour cell system information in respect of at least one neighbour cell on a slow associated control channel or on a fast associated control channel. The corresponding mobile station method will now be described with reference to the flowchart of FIG. 9. The method includes in block 9-1 the mobile station receiving neighbour cell system information in respect of at least one neighbour cell on a slow associated control channel or a fast associated control channel.

The methods described with reference to the flowcharts of FIGS. 6 through 9 may, for example, be implemented by the mobile station 500 of FIG. 4, or the mobile station 1000 of FIG. 5 for mobile station implemented methods. The network implemented methods may, for example, be implemented by the network 520 of FIG. 4. This may for example involve the serving transceiver 521. In other embodiments, the request is received over a packet switched control channel available to a mobile station having a packet switched connection.

Numerous modifications and variations of the present application are possible in light of the above teachings. It is therefore to be understood that within the scope of the appended claims, the application may be practiced otherwise than as specifically described herein.

We claim:

1. A method for enabling expedited call re-establishment comprising:
   as part of a neighbour cell system information exchange that is independent of a handover:
   a) a serving cell receiving a request for neighbour cell system information from a mobile station for enabling expedited call re-establishment of a voice call in a neighbour cell in the event of failure of the call in the serving cell, wherein the request includes an identification of at least one neighbour cell;
   b) in response to the request, the serving cell transmitting to the mobile station neighbour cell system information for each neighbour cell identified in the request.

2. The method of claim 1 wherein:
   receiving a request for neighbour cell information comprises receiving the request on an uplink control channel available to a mobile station in CS (circuit switched)-only mode; and
   transmitting neighbour cell system information comprises transmitting the neighbour cell information on a downlink control channel available to a mobile station in CS (circuit switched)-only mode.

3. The method of claim 2 wherein each control channel is a control channel that may steal speech frames to send control information.

4. The method of claim 3 further comprising configuring a discontinuous set of transmission periods for downlink transmission to a given mobile station;
   wherein the transmission of neighbour cell system information occurs during one of the downlink discontinuous transmission periods.

5. The method of claim 2 wherein each control channel is a FACCH (fast associated control channel).

6. The method of claim 2 wherein each control channel is a SACCH (slow associated control channel).

7. The method of claim 1 wherein:
   receiving a request for neighbour cell information comprises receiving the request on an uplink packet switched control channel available to a mobile station having a packet switched connection;
   transmitting neighbour cell system information comprises transmitting the neighbour cell information on a downlink packet switched control channel available to a mobile station having a PS connection.

8. The method of claim 7 wherein each control channel is a PACCH (packet associated control channel).

9. The method of claim 1 wherein the request includes an indication of which system information is being requested.

10. The method of claim 9 wherein the indication of which system information is being requested comprises a bitmap in respect of a set of defined SI blocks.

11. The method of claim 1 wherein:
    if the request includes an indication of which system information is being requested treating the request as a request for the system information thus indicated; and
    if the request for neighbour cell information that does not include an indication of any specific system information treating the request as a request for all of a predefined set of system information.

12. The method of claim 1 further comprising:
    prioritizing the neighbour cell system information transmission by transmitting system information taking into account prioritization.

13. The method of claim 1 further comprising:
    transmitting a "no change" message to indicate there is no change to previously transmitted neighbour cell system information.

14. The method of claim 1 further comprising:
    configuring a system information validity that is longer than 30 seconds at least for the transmitted neighbour cell system information.

15. The method of claim 1 further comprising:
    transmitting an indication of whether a mobile station is permitted to request for neighbour cell system information.

16. The method of claim 1 wherein the system information comprises a set of parameters that enable a mobile station to establish a connection to the neighbour cell in the event a connection to the serving cell is lost.

17. The method of claim 1 wherein expedited call re-establishment to a neighbour cell comprises cell re-establishment without acquiring system information broadcast by the neighbour cell before accessing the neighbour cell.

18. The method of claim 1 wherein the request is for the purpose of enabling expedited cell re-establishment in the event of a subsequent radio link failure.

19. The method of claim 18 wherein the mobile station stops using a traffic channel in the serving cell when a radio link failure is determined.

20. A method in a mobile station, the method for enabling expedited call re-establishment comprising:
   as part of a neighbour cell system information exchange that is independent of a handover;
   a) transmitting a request for neighbour cell system information to a serving cell, for enabling expedited call re-establishment of a voice call in a neighbour cell in the event of failure of the call in the serving cell, and the request including an identification of at least one neighbour cell;
   b) in response to the request, receiving neighbour cell system information for each neighbour cell identified in the request;
   following failure of the call, sending a message on a random access channel requesting call-reestablishment to one of the neighbour cells identified in the request using system information obtained prior to failure of the call.

21. The method of claim 18 wherein:
   transmitting a request for neighbour cell information comprises transmitting the request on an uplink control channel available to the mobile station in CS (circuit switched)-only mode; and
   receiving neighbour cell system information comprises receiving the neighbour cell information on a downlink control channel available to the mobile station in CS (circuit switched)-only mode.

22. The method of claim 20 wherein each control channel is a control channel that steals speech frames to send control information.

* * * * *